UNITED STATES PATENT OFFICE.

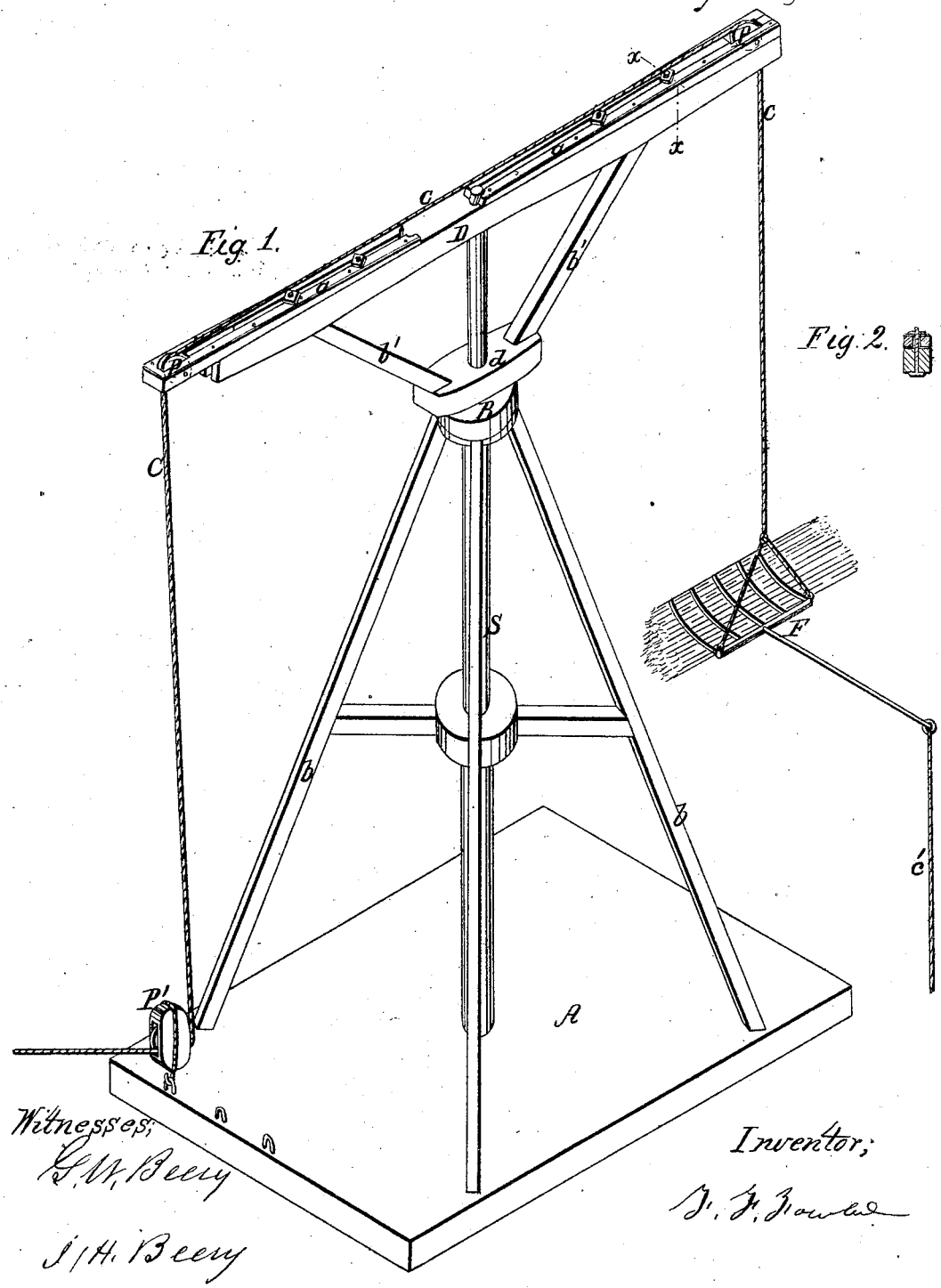

F. F. FOWLER, OF CRANE TOWNSHIP, WYANDOT COUNTY, OHIO.

IMPROVEMENT IN ELEVATORS FOR HAY, &c.

Specification forming part of Letters Patent No. 27,899, dated April 17, 1860.

REISSUED

*To all whom it may concern:*

Be it known that I, F. F. FOWLER, of Crane township, in the county of Wyandot and State of Ohio, have invented a new and useful Improvement in Elevators for Hay and other Purposes; and I do hereby declare that the following is a full, clear, and exact description of the same, reference being had to the annexed drawings, forming part of this specification, in the several figures of which similar characters of reference denote the same parts.

Figure 1 is a perspective view of the elevator. Fig. 2 is a vertical section on line $x\ x$.

This invention has for its object elevating the hay on the stack in forming the stack; and its nature consists in having a platform which may be placed on wheels or runners, if desired, to convey it from place to place. In the center of the platform is a shaft or pole, supported by four braces running from the corners of the platform to a head-block at about three-fourths the length of the shaft, the shaft extending through the head-block; and there is a cross-bar braced to a block, having a hole through which this shaft passes, so as to allow this block to rest on the head-block, the shaft also passing through the bar, so as to allow the bar to revolve on it. On this cross-bar are two sliding arms, which are adjustable by bolts passing through slots in them and through the cross-bar. At each end of these arms is a pulley, over which passes a rope having a hay-fork attached to one end, and the other end passes down and over another pulley on the platform, and is attached to the horse, so as to raise the fork and hay. There is also a cord to end of fork-handle, which is held by a person below, so as to keep the weight of the hay from turning over the fork.

In the drawings, A is the platform; S, the shaft, supported by braces $b\ b$; B, the head-block; D, the revolving cross-bar, connected by braces $b'$ with block $d'$; $a\ a$, their adjustable arms; P, their pulleys; $c$, the rope passing over them; P', the pulley on the platform; F the fork, and $c'$ the cord to the handle of the fork.

The fork is filled with hay, and the horse being attached to the other end of rope $c$, the fork is drawn up to the stack by the cord passing over pulleys P, and as soon as the cord $c'$ is released the weight of the hay overturns the fork and throws the hay on the stack. After one stack is made, by turning around the cross-bar D another stack can be formed, and by drawing out the sliding arms $a$, still another row of stacks can be made, the revolving cross-bar allowing as many stacks as desired to be made without moving the machine.

I claim—

The revolving cross-bar D, constructed, as described, with its adjustable arms $a$ and pulleys P, in combination with shaft S, platform A, fork F, ropes $c$ and $c'$, and pulley P', operating substantially as and for the purposes set forth.

In testimony whereof I have hereunto signed my name before two subscribing witnesses.

F. F. FOWLER.

Witnesses:
   W. S. WILSON,
   A. W. BRINKERHOFF.